(12) United States Patent
Jones

(10) Patent No.: US 6,604,683 B1
(45) Date of Patent: Aug. 12, 2003

(54) BAR CODE REGISTRATION OF OPTICALLY ADDRESSED PHOTO-LUMINESCENT DISPLAYS

(75) Inventor: Michael R. Jones, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 194 days.

(21) Appl. No.: 09/923,030

(22) Filed: Aug. 6, 2001

(51) Int. Cl.[7] .................................................. G06K 7/10
(52) U.S. Cl. ............................ 235/462.14; 235/462.01; 345/156; 345/45; 395/106; 707/530; 348/800
(58) Field of Search ........................ 235/462; 345/156, 345/45; 395/106; 707/530; 348/800

(56) References Cited

U.S. PATENT DOCUMENTS

| | | | | |
|---|---|---|---|---|
| 3,918,803 A | * | 11/1975 | Friesem | 353/121 |
| 5,616,909 A | * | 4/1997 | Arackellian | 235/462.22 |
| 5,638,208 A | * | 6/1997 | Walker | 359/443 |
| 6,005,547 A | * | 12/1999 | Newman et al. | 345/156 |
| 6,203,069 B1 | * | 3/2001 | Outwater et al. | 283/88 |

OTHER PUBLICATIONS

R. L. Van Ewyk, I. O'Connor, A. Mosley, A. Cuddy, C. Hilsum, C. Blackburn, J. Griffiths and F. Jones, "Anisotropic fluorophors for liquid crystal displays," pp. 155–160, Displays, Oct. 1986.

Andrew P. Davey, Robert G. Howard and Werner J. Blau, "Polarised photoluminescence from oriented polymer liquid crystal films", pp. 417–420, J. Mater. Chem., 1997.

Christoph Weder, Christian Sarwa, Cees Bastiaansen and Paul Smith, "Highly Polarized Luminescence from Oriented Conjugated Polymer/Polyethylene Blend Films", pp. 1035–1039, Advanced Materials 1997, 9, No. 13.

D. J. Broer, R. van Asselt, R.A.W. van Rooij and C.M.R. de Witz, "Photoluminescent liquid crystal displays—Recent developments and trends in Europe", pp. 235–238, IDW '98.

J.C. Wittmann, S. Meyer, P. Damman, M. Dosiere and H–W. Schmidt, "Preparation and characterization of side–chain liquid crystalline polymer thin films aligned on PTFE friction–transferred layers", pp. 3545–3550, Polymer vol. 39, No. 15, 1998.

* cited by examiner

Primary Examiner—Karl D. Frech
Assistant Examiner—Daniel A. Hess
(74) Attorney, Agent, or Firm—Nathan O. Jensen; Kyle Eppele

(57) ABSTRACT

An optically addressed photo luminescent display having a printed bar code pixel identifier on an internal side for providing feedback of scanning beam to pixel registration.

20 Claims, 1 Drawing Sheet

BAR CODE REGISTRATION OF OPTICALLY ADDRESSED PHOTO-LUMINESCENT DISPLAYS

CROSS-REFERENCE TO RELATED APPLICATION

This application relates to co-pending application entitled "OPTICALLY ADDRESSED DIRECT VIEW PHOTO-LUMINESCENT DISPLAY" by the same inventor, assigned to the same assignee, and filed on even date herewith, which application is incorporated herein in its entirety by this reference.

1. Field of the Invention

The present invention generally relates to displays, and more particularly relates to optically addressed displays, and even more particularly relates to methods and systems for registering an optical beam used to address pixels in a display.

2. Background of the Invention

For many years, avionics engineers have endeavored to improve the image quality of displays used in aircraft cockpits. In today's air transport jetliners, it is becoming increasingly desirable to have displays which are simultaneously viewable by several members of the flight crew (cross-cockpit viewing). This is often a significant challenge for liquid crystal displays, which often have viewing angle limitations. Also, these cockpits frequently experience very high ambient light conditions which increase the brightness requirements for cockpit displays. One display type that has been proposed to address these requirements is the optically addressed direct view photo luminescent display.

While the direct view phosphor panel associated with these displays provides excellent viewing angle and brightness characteristics, they do have several drawbacks. At least one of these is that improper coloration and other problems can occur, if the display is excited by a scanned beam of light, because it is often difficult to obtain and maintain proper registration between the scanning beam and the display pixels.

Consequently, there exists a need for improved methods and systems for improving display quality in optically addressed displays in an efficient manner.

SUMMARY OF THE INVENTION

It is an object of the present invention to provide a system and method for improving display quality in optically addressed displays in an efficient manner.

It is a feature of the present invention to include a bar coded beam registration scheme.

It is an advantage of the present invention to achieve improved efficiency in registering a scanning light beam with discrete pixels in the display.

The present invention is an apparatus and method for improving the quality of optically addressed displays, designed to satisfy the aforementioned needs, provide the previously stated objects, include the above-listed features, and achieve the already articulated advantages. The present invention is carried out in a "misregistration-less" manner in a sense that the misregistration of a scanning light beam with respect to individual display pixels has been greatly reduced.

Accordingly, the present invention is a system and method for improving the quality of optically addressed displays which include a bar coding disposed on a backside of a display surface and a detector and feedback mechanism for registering a scanning optical beam.

BRIEF DESCRIPTION OF THE DRAWINGS

The invention may be more fully understood by reading the following description referred embodiments of the invention, in conjunction with the appended drawings wherein.

DETAILED DESCRIPTION

Figure 1:
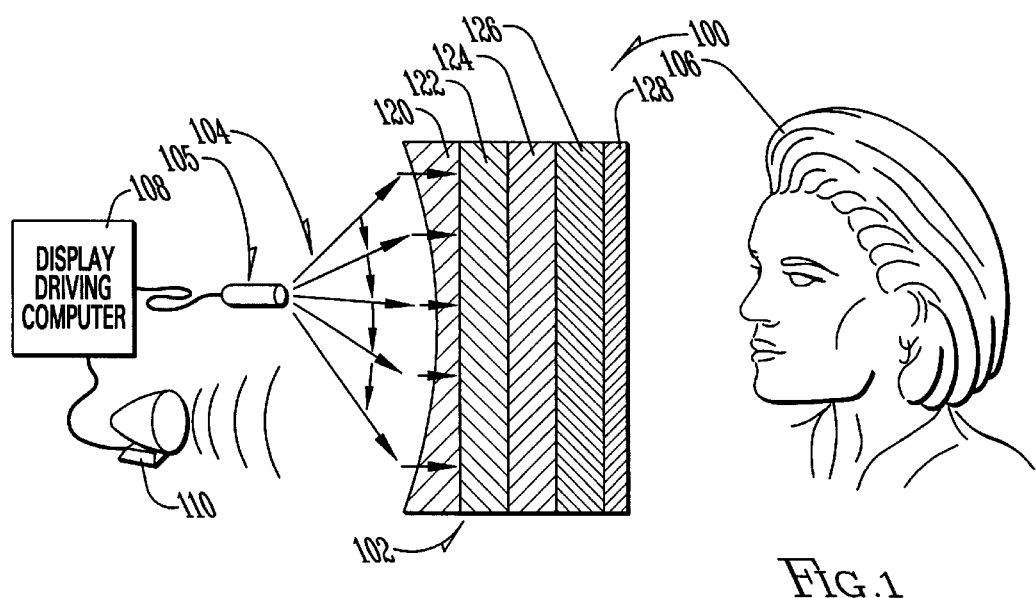
FIG. 1 is a simplified partial cross-section view of a system of the present invention.

Now referring to the drawings wherein like numerals refer to like matter throughout, and more specifically referring to FIG. 1, there is shown a system of the present invention generally designated 100, which includes a display panel 102. Also shown in FIG. 1 is scanning light beam 104 which is emitted from light beam source 105, which can be a laser light source or a UV LED and optics, such as is commercially available from Nichia Chemical Industries, LTD. of Tokushima, Japan. The spectral frequency of scanning light beam 104 is a matter of designer's choice and should be matched to a particular type(s) of phosphors used. It should also be noted here that the present bar coding registration scheme, while described herein as being used with a direct view phosphor display, could be used for other displays as well. The direct view phosphor display is, however, believed to be the preferred display. Scanning light beam 104 is preferably scanned using known techniques for scanning beams in optically addressed displays, such as x-y mirrors or acousto-optical modulators. Other means of optically addressing a display panel could be employed as well.

The purpose of display 100 is to provide a high quality image to viewer 106. To assure that the display being presented resembles the intended image, the primary novel feature of the present invention is that it includes a "scanning or addressing beam to pixel" or pixel group registration scheme, which includes a registration feedback photodetector 110, which detects light from scanning light beam 104 (or other type of addressing optical beam) which, during the excitation process, is reflected off an array of registration bar codes 122 disposed in the display panel 102. The spectral reflectance of the registration bar codes 122 is a matter of designer's choice and should be matched to spectral frequency of scanning light beam 104. The level of specular and diffuse reflectance is also a matter of designer's choice. The diffuse reflectance should be large enough (greater than 10%) to produce a detectable signal at the registration feedback photodetector 110. Registration bar codes 122 provide uniquely identifiable reflections from individual pixels or display areas. These uniquely identifiable reflections are captured by registration feedback photodetector 110 and provided to display driving computer 108, where it is used to feed back information relating to the registration of scanning light beam 104. These registration bar codes 122 can be minute bar codes which are thin films or other matter printed on the back of phosphor panel 124. It is believed that registration bar codes 122 are preferably made of reflective material; however, it is possible that the registration bar codes 122 can be an absorptive material, and the reflections of the array of registration bar codes 122 are identified by the lack of reflection from a particular location. Various methods of creating and arranging registration bar codes 122 could be used, depending upon the particular requirements of any application. Whether an individual pixel or merely a display segment is used for registration is a matter of designer's choice as well.

In some applications, it may be preferred to include a lens (refractive or diffractive) 120 which refracts/diffracts the scanning light beam 104, so that it is more collimated as it passes through registration bar codes 122 and the phosphor panel 124.

Phosphor panel 124 may, in a preferred embodiment, be a broad spectrum producing molecularly aligned non-pixelated phosphor material used in conjunction with a pixelated color filter 126. Pixelated color filter 126 may be a filter of the type which is well known in the art of LCDs. If attenuation of the scanning light beam 104 is desired, which may be the case for UV light, a dielectric UV blocking element 128 can be disposed between the phosphor panel 124 and the viewer 106. This dielectric UV blocking element 128 can be an optical bandstop filter or a frequency dependent reflector, both of which are well known in the art. Other well-known means for reducing emission of excitation radiation could be used as well.

In some applications where brightness is critical, it may be desirable to provide a multi-color pixelated phosphor panel 124 which has individual color emissive elements which are individually addressed by the scanning light beam 104. This would eliminate the need for pixelated color filter 126 and its associated brightness attenuation.

Throughout this description, reference is made to avionics, because it is believed that the beneficial aspects of the present invention would be most readily apparent when used in an aviation environment; however, it should be understood that the present invention is not intended to be limited to use in such an environment and should be hereby construed to include other non-avionics displays as well.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

What is claimed is:

1. An apparatus for generating an image comprising:
   a photo-luminescent phosphor display surface having a plurality of pixels thereon which are adapted and configured to be addressable with an optical beam;
   an optical addressing and excitation means disposed on a rear side of said surface when an opposing first side of said surface is a primary direction of image viewing;
   wherein said optical addressing and excitation means includes a light beam;
   a plurality of unique reflective identifiers disposed on said back side;
   said plurality of unique reflective identifiers being placed, oriented and configured to reflect light incident thereon from said light beam and thereby create a plurality of identifying reflections; and,
   a photodetector adapted and configured to receive the plurality of identifying reflections and provide a registration feedback signal to said light beam.

2. An apparatus of claim 1 wherein said plurality of unique reflective identifiers is a plurality of bar codes.

3. An apparatus of claim 2 wherein said bar codes are printed bar codes.

4. An apparatus of claim 2 wherein said light beam is a scanning light beam.

5. An apparatus of claim 4 wherein said scanning light beam is a UV light beam.

6. An apparatus of claim 5 wherein said optical addressing and excitation means further comprises acousto-optical modulators which are adapted, positioned and configured for scanning said UV light beam across said rear side of said display surface.

7. An apparatus of claim 6 further comprising a collimating lens disposed between a source of said UV light beam and said plurality of bar codes.

8. An apparatus of claim 7 wherein said source of a UV light beam is a laser.

9. An apparatus of claim 5 wherein said optical addressing and excitation means further comprises x-y mirrors which are adapted, positioned and configured for scanning said UV light beam across said rear side of said display surface.

10. An apparatus for generating an image comprising:
    a display surface having a plurality of pixels thereon which are adapted and configured to be addressable with an optical beam;
    an optical addressing means disposed on a rear side of said surface when an opposing first side of said surface is a primary direction of image viewing;
    wherein said optical addressing means includes a light beam;
    a plurality of unique reflective identifiers disposed on said back side;
    said plurality of unique reflective identifiers being placed, oriented and configured to reflect light incident thereon from said light beam and thereby create a plurality of identifying reflections;
    a photodetector adapted and configured to receive the plurality of identifying reflections and provide a registration feedback signal to said light beam;
    wherein said plurality of unique reflective identifiers is a plurality of bar codes;
    wherein said light beam is a scanning light beam;
    wherein said scanning light beam is a light beam;
    wherein said optical addressing means further comprises acousto-optical modulators which are adapted, positioned and configured for scanning said UV light beam across said rear side of said display surface;
    a collimating lens disposed between a source of said UV light beam and said plurality of bar codes;
    wherein said source of a UV light beam is a laser; and
    a dielectric UV blocking element.

11. An apparatus of claim 10 wherein said dielectric UV blocking element is an optical bandstop filter or a frequency dependent reflector.

12. An apparatus of claim 10 wherein said dielectric UV blocking element is a frequency dependent reflector.

13. An apparatus of claim 10 wherein said display surface is a phosphor panel.

14. An apparatus of claim 13 wherein said phosphor panel is a multi-color pixelated phosphor panel.

15. A method of registering a scanning beam in an optically addressed display comprising the steps of:
    providing a plurality of unique registration bar codes disposed on an interior side of a phosphor display surface;
    optically addressing and exciting phosphor on said interior side of said phosphor display surface with a light source;
    receiving a plurality of reflections from said light source where said plurality of reflections is influenced by said unique registration bar codes; and, adjusting a directional aspect of a light beam originating from said light source in response to receiving said plurality of reflections.

16. A method of claim 15 wherein said plurality of unique registration bar codes is a plurality of reflective bar codes.

17. A method of claim 16 wherein said step of adjusting a directional aspect is accomplished through use of a feedback mechanism employing a photodetector.

18. A method of claim 17 wherein said step of receiving a plurality of reflections includes receiving a plurality of reflections from reflective bar codes which are associated with individual color elements within a pixelated display.

19. A method of claim 17 wherein said display surface is a photo-luminescent phosphor panel.

20. An improved optically addressed phosphor display of the type having a pixelated phosphor panel; and a scanning optical beam which is adapted and configured to be used to address individual pixels within said pixelated phosphor panel, where the improvement comprises:

a plurality of unique registration bar codes disposed interior of said pixelated phosphor panel, where each of said plurality of unique registration bar codes is spatially associated with a unique pixel on said pixelated phosphor panel; and, a feedback mechanism coupled with said scanning optical beam for adjusting an operational registration characteristic of said scanning optical beam in response to reflections, received by a photodetector, from said plurality of unique registration bar codes.

* * * * *